US Patent Number: 4,578,749
Date of Patent: Mar. 25, 1986
Kuno et al.

[54] METHOD FOR MEASURING DRIVING AMOUNT OF MOTOR AND APPARATUS THEREFOR

[75] Inventors: Toshitaka Kuno, Nagoya; Atsushi Kamiya, Kariya, both of Japan

[73] Assignee: Kabushiki Kaisha Toyota Chuo Kenkyusho, Aichi, Japan

[21] Appl. No.: 506,125

[22] Filed: Jun. 20, 1983

[30] Foreign Application Priority Data

Jun. 23, 1982 [JP] Japan .................................. 57-108146
Jun. 23, 1982 [JP] Japan .................................. 57-108147

[51] Int. Cl.⁴ .............................................. G05B 19/00
[52] U.S. Cl. ........................................ 364/167; 901/9; 364/513; 318/603; 318/636
[58] Field of Search .................... 901/9; 364/167, 170, 364/178, 474, 513; 318/600, 601, 603, 636; 377/17

[56] References Cited

U.S. PATENT DOCUMENTS 4,201,911 5/1980 Dering .................................. 377/17
4,245,297 1/1981 Bertram .............................. 377/17

Primary Examiner—Jerry Smith
Assistant Examiner—Allen MacDonald
Attorney, Agent, or Firm—Parkhurst & Oliff

[57] ABSTRACT

In a method and apparatus for measuring a driving amount of a motor, relative driving amounts and absolute driving amounts are sampled in each predetermined driving amount pulse train on the basis of an origin of a motor, the relative driving amounts, coefficient and constant of at least one linear approximate equation representing the relation between the relative driving amount and the absolute driving amount are obtained from the relative driving amounts and the absolute driving amounts sampled, and the coefficient and constant obtained are preliminarily stored in a non-volatile memory.

Accordingly, the contents in the non-volatile memory are utilized at a starting time of a motor whereby the present position indication of the motor can be conducted without effecting an origin indication of the motor.

18 Claims, 18 Drawing Figures

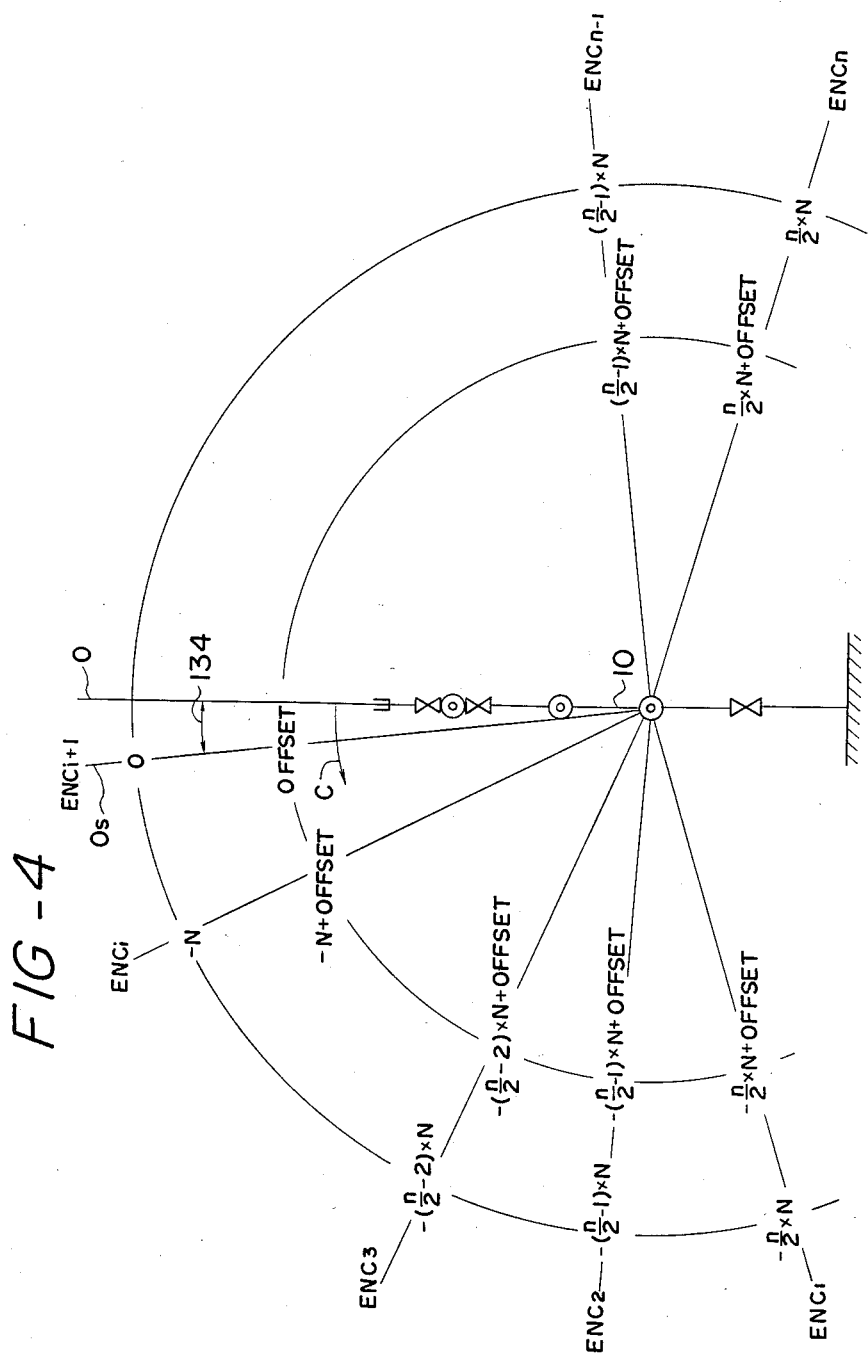

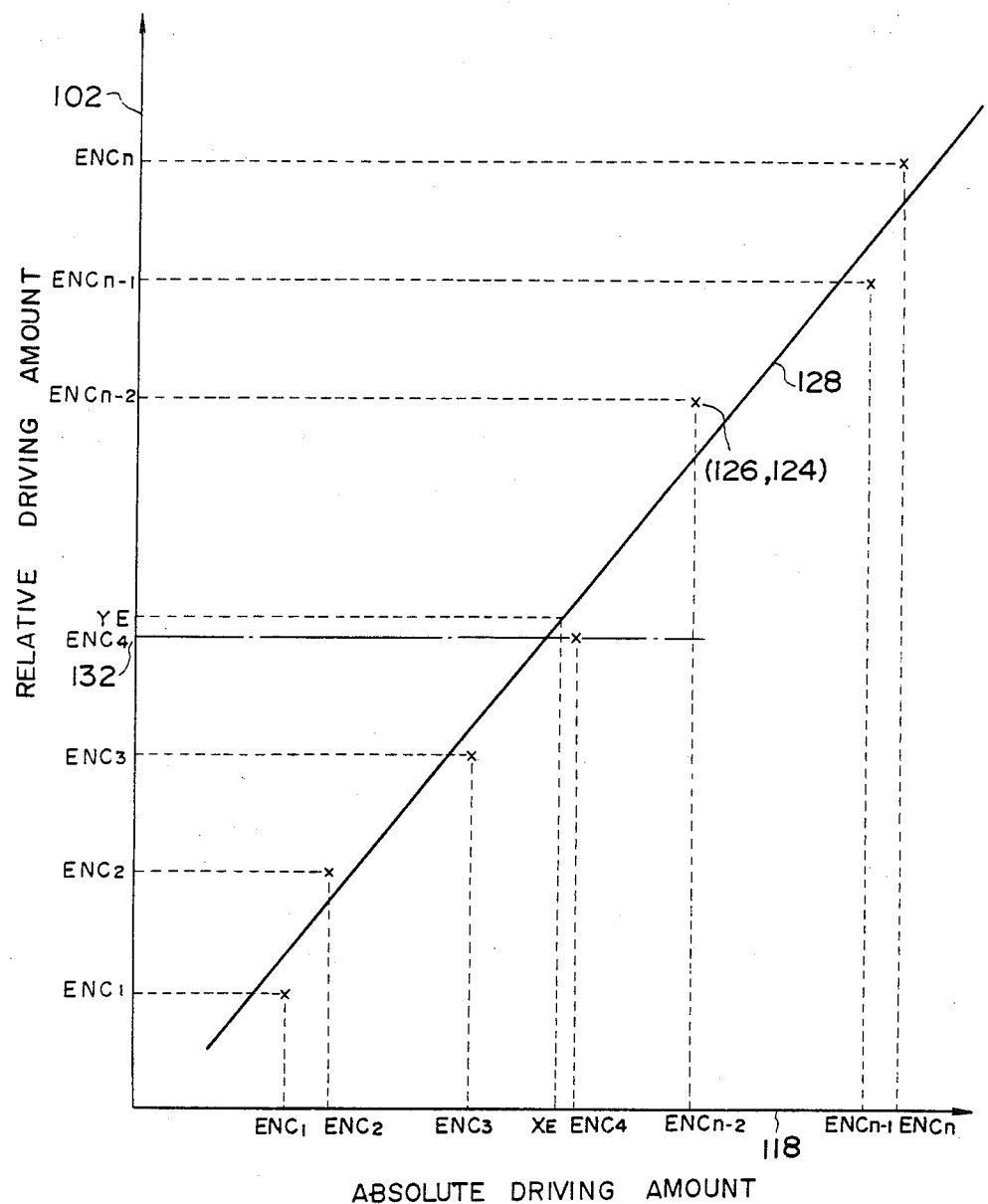

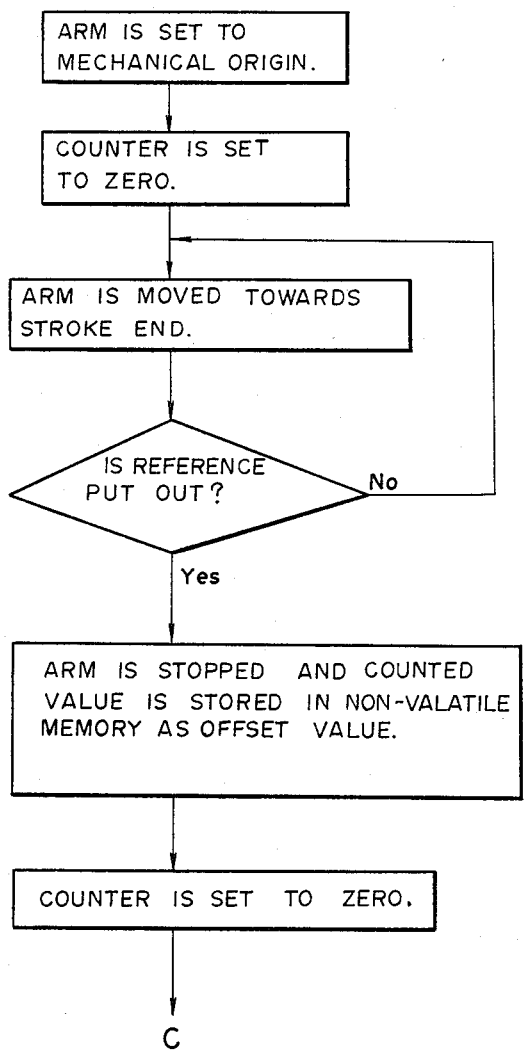

METHOD FOR MEASURING DRIVING AMOUNT OF MOTOR AND APPARATUS THEREFOR

BACKGROUND OF THE INVENTION

1. Field of the Invention

The present invention relates to an apparatus and a method for measuring a driving amount of a motor, in which a relative driving amount of the motor is measured by use of an encoder of an increment type.

2. Description of the Prior Art

Encoders have widely been used for measuring such a driving amount of a motor as a displacing amount or a velocity of a body driven by a motor. Particularly, in such a case that many encoders are used whereby costs therefor is increased, encorders of an increment type are utilized. In this case, the driving amount of the motor has been measured in the prior arts as follows:

An industrial robot to which the apparatus according to a prior method is applied is shown in FIG. 1, in which an arm 10 thereof is driven by a motor 14 mounted on a joint portion 12 and an attitude of the arm 10 is controlled in response to a position command signal 100 put out from a position command signal output circuit 16. That is, the position command signal 100 from the position command signal output circuit 16 is compared with a feedback amount 102 supplied from a feedback system in a comparator 18, a compare output 104 corresponding to a deviation of the feedback amount 102 to the position command signal 100 is supplied from the comparator 18 to a digital to analog converter (hereinafter referred to as D/A converter) 20 wherein the compare output 104 is converted to an analog value, and the analog value is supplied to a driver 22 so that the motor 14 is driven by the driver 22. As a result, the arm 10 is controlled to its attitude responding to the positon command signal 100.

For the purpose of obtaining the feedback amount 102, an apparatus for measuring a driving amount of a motor according to the prior art is utilized, in which an encoder of an increment type 24 is connected directly to a driving shaft of the motor 14. The encoder 24 functions to put out driving amount pulses 106 of the number corresponding to a driving amount, i.e. a rotation angle, of the motor 14 and also functions to put out a reference pulse 108 (which is put out at a position responding to the origin of the motor) in each predetermined interval of the driving amount pulses 106 (one rotation herein).

The position where the reference pulse 108 is put out is defined as an electrical origin of the encoder 24. The driving amount pulses 106 are supplied to a counter 26 in which the number of the driving amount pulses 106 is counted, the feedback amount 102 is obtained from the counted number and thereafter it is supplied to the comparator 18.

In such an apparatus, if the number of the driving amount pulses 106 of the encoder 24 is merely counted by the counter 26, a mechanical origin of the arm 10 does not correspond to the electrical origin of the encoder 24. Accordingly, the counted number can not be utilized, as the feedback amount 102, for which the apparatus is constructed such that the fitting of the above two origins can be carried out in the following manner.

As shown in FIG. 1, the apparatus is provided with an origin-fitting command circuit 28 and an origin-fitting command signal 110 put out therefrom is supplied to a counter zero-setting circuit 30 and also to a fine speed rotation command circuit 32. The counter zero-setting circuit 30 is capable of setting a zero-setting signal 112 in the counter 26 and the fine speed rotation command circuit 32 is capable of giving to the D/A converter 20 a fine speed rotation command signal 114 so as to control the the motor 14 to its fine speed rotation. In addition, the apparatus is provided with a dog 34 driven together with the driving shaft of the motor 14 and the arm 10, and, when the dog 34 together with the arm 10 is driven and the arm 10 is moved to a neighborhood of the mechanical origin of the arm 10, the switch 36 is switched on so that an origin vicinity detecting signal 116 is supplied to the counter zero-setting circuit 30 to which the reference pulse 108 is also supplied.

Description will now be given of operation of the apparatus according to the prior method:

First, the mechanical origin of the arm 10 is precisely set by use of a levelling instrument, a transit instrument or the like. Next, with the driving shaft of the motor 14 driven, it is made sure by such an instrument as an osciloscope that the reference pulse 108 is put out from the encoder 24, and thereafter a motor unit containing the motor 14 and the encoder 24 is mounted on the arm 10. Sequentially, the position of the dog 34 is adjusted such that the switch 36 is switched on in the vicinity of the mechanical origin Os. Furthermore, in these conditions, the counter 26 is reset, or set to zero. Thus, the motor unit is assembled to the robot.

When such an accident as an instantaneous power stoppage happens while the robot is working, the work of the robot is interrupted and the arm 10 is stopped in the position interrupted. At this time, the contents of the counter 26 is cleared due to the power stoppage whereby the correspondence of the mechanical origin of the arm 10 and the electrical origin of the encoder 24 is broken. Therefore, the origin indication to the robot is carried out as follows;

First, the arm 10 is moved by a manual operation until the switch 36 is switched on so that the driving shaft of the motor 14 is set to the neighborhood of the mechanical origin. Next, the origin-fitting command signal 110 is put out from the origin-fitting command circuit 28 to be supplied to the fine speed rotation command circuit 32 and the fine speed rotation command signal 114 put out from the fine speed rotation command circuit 32 is supplied to the driver 22 so that the motor 14 is rotated with a fine velocity. When the encoder 24 reaches the mechanical origin Os during the fine velocity rotation of the motor 14 and the reference pulse 108 is put out, the zero-setting signal 112 is put out from the counter zero-setting circuit 30 whereby the counter 26 is set to zero, or reset. Thus, the origin indication is completed.

After the completion of the origin indication, if the motor 14 is driven in response to the position command signal 100 put out from the position command signal output circuit 16, the counted number of the counter 26 corresponds to the relative driving amount based upon the mechanical origin of the motor 14. The relative driving amount is utilized as the feedback amount 102 whereby the arm 10 is controlled precisely to its attitude responding to the position command signal 100.

As set forth above, in the prior art since such a driven body as the arm 10 of the robot must be moved manually up to the small region where the origin-fitting can be carried out, it is difficult to conduct the origin-fitting and a long time is taken therefor.

Particularly, in case that the prior art is applied to the robot, as shown in FIG. 1, it is generally rare for the robot to work in the vicinity of the origin in view of the working area of the robot. Furthermore, in such a case that the power source for the robot is suddenly cut off during the work of the robot the arm 10 must be moved manually up to the region for the purpose of the origin-fitting while the arm 10 is being subjected to operation avoiding obstacles, which are not easy. Accordingly, a long time is taken for the origin indication in the prior art.

SUMMARY OF THE INVENTION

The present invention has been developed to obviate the above-described disadvantages of the prior art and has as its object the provision of a method and apparatus for measuring a driving amount of a motor capable of indicating the present position of a driven body easily without affecting the origin indication in the same manner that expensive encoders of an absolute type having a high accuracy.

The method for measuring a driving amount of a motor according to the present invention comprises the steps of (a) detecting the number of driving amount pulses corresponding to a driving amount of the motor by use of an encoder of an increment type, (b) setting a driving amount pulse of the driving amount pulses responding to an origin of the motor, (c) counting the number of the driving amount pulses on the basis of the origin of the motor to obtain a relative driving amount of the motor based upon the origin of the motor from the counted number of the driving amount pulses, (d) sampling the relative driving amount of the motor and an absolute driving amount thereof at each predetermined interval the driving amount pulses, of (e) obtaining coefficient and constant of at least one linear approximate equation representing the relation between the relative driving amount and the absolute driving amount from the sampled relative and absolute driving amounts to store the coefficient and constant in a non-volatile memory, (f) driving a driving shaft of the motor from its present rotational position to a sampling position near the present rotational position at a starting time of the motor to sample an absolute driving amount the motor at the starting time, and of (g) obtaining a relative driving amount of the motor in the sampling position at the starting time on the basis of the origin by use of the absolute driving amount at the starting time and the coefficient and constant of the linear approximate equation stored in the non-volatile memory. In addition, the the apparatus for measuring a driving amount of a motor according to the present invention comprises (a) an encoder of an increment type mounted on a driving shaft of the motor and putting out driving amount pulses of the number corresponding to a driving amount of the motor, (b) a counter counting the number of the driving amount pulses on the basis of an origin of the motor to detect a relative driving amount of the motor, (c) an absolute driving amount detector detecting an absolute driving amount of the motor, (d) a sampling command output circuit putting out a driving amount sampling command signal at each predetermined interval of the driving amount pulses, (e) a coefficient and constant calculating circuit for calculating coefficient and constant sampling the relative driving amount and the absolute driving amount in response to the driving amount sampling command signal to obtain coefficient and constant of at least one linear approximate equation representing the relation between the relative driving amount and the absolute driving amount from the respective sampled driving amounts, (f) a non-volatile memory storing the coefficient and constant of the linear approximate equation obtained in the coefficient and constant calculating circuit therein, and (g) a present driving amount setting circuit obtaining a relative driving amount of the motor at a starting time of the motor in the sampling position from an absolute driving amount at the starting time sampled at the time when the motor is driven from its present rotational position to the sampling position near the present rotational position and from the coefficient and constant read out from the non-volatile memory in response to the absolute driving amount at the starting time sampled so as to set the relative driving amount at the starting time in the counter.

In the method and the apparatus according to the present invention, the encoder of an increment type which is inexpensive is used, the coefficient and constant of the linear approximate equation representing the relation between the relative driving amount and the absolute driving amount are preliminarily stored in the non-volatile memory and the origin indication is carried out utilizing the coefficient and constant stored. The method and the apparatus can be caused to possess the substantially same precision in measurement as the case that an expensive encoder of an absolute type having a high analysability and a wide detecting range of position of a driven body is used and the operationability and the operation rate of such a driven body as a robot are enhanced owing to the fact that the present position indication which is troublesome and takes a long time is made unnecessary. Accordingly, in case that the method and the apparatus according to the present invention is applied to such a system as a robot having many driving shafts to which many encoders are mounted, large cost effectiveness can be obtained.

Furthermore, since the driven body may be driven up to the nearest reference position, or within one rotation of the driven body, for the purpose of the present position indication, the operation time of the driven body for the present position indication can be shortened and the operation of the driven body therefor can also be restricted within a small range so that the operation rate of the system to which the present invention is applied can be enhanced. In addition thereto, when the system is applied to the robot, the operations for avoiding obstacles or dangers are made unnecessary because the operation range of the driven body for the present position indication is small.

In one aspect of the above-described method for measuring a driving amount of a motor according to the present invention, the step (e) comprises obtaining coefficients and constants of a plurality of linear approximate equations constituting a polygonal line representing the relation between the relative driving amount and the absolute driving amount from the sampled relative and absolute driving amounts and causing available areas of the respective linear approximate equations, in which the deviation between the approximate relative driving amounts and real relative driving amounts corresponding to the absolute driving amounts is put in predetermined allowable error, to correspond to the coefficients and constants of the relative linear approximate equations to store the available areas, and the coefficients and constants in the non-volatile memory. The step (g) comprises reading out the coefficient and constant about the linear approximate equation existing in the available area, where the absolute driving amount of the motor is put at the starting time, to obtain a relative driving amount of the motor at the starting time from the coefficient and constant read out and the absolute driving amount at the starting time.

In one aspect of the above-stated apparatus for measuring a driving amount of a motor according to the present invention, the coefficient and constant calculating circuit is provided with a means for obtaining coefficients and constants of a plurality of linear approximate equations constituting a polygonal line representing the relation between the relative driving amount and the absolute driving amount from the sampled relative and absolute driving amounts and causing available areas of the respective linear approximate equations, in which the deviation between the approximate relative driving amounts and real relative driving amounts corresponding to the absolute driving amounts is put in predetermined allowable error, to correspond to the coefficients and constants of the linear approximate equations, to store the available areas and the coefficients and constants in the non-volatile memory, and the present driving amount setting circuit is provided with a means for reading out the coefficient and constant of the linear approximate equation of the available area containing the absolute driving amount at the starting time from the non-volatile memory to obtain a relative driving amount at the starting time from the coefficient and constant read out and the absolute driving amount at the starting time.

These aspects have the following advantages in addition to the merits described above.

In the above-described aspects, as the detected values detected by the absolute driving amount detector are adjusted to obtain the polygonal line and the present position indication is conducted on the basis of the polygonal line, an accuracy in measurement can be improved than the case that the the detected values are approximated by one linear approximate equation.

In addition, the aspects have such a merit that, even if the linearity of such an absolute driving amount detector as a potentiometer is partially deteriorated due to its use extending over a long period, the accuracy in measurement is not deteriorated for a long time because the deterioration of the accuracy can be saved owing to the polygonal line approximation.

BRIEF DESCRIPTION OF THE DRAWINGS

The present invention will be described with reference to the appended figures, wherein:

FIG. 4 is a diagram explaining sampling motions of a relative driving amount and an absolute driving amount in the embodiment shown in FIG. 3;

FIG. 5 is a graph explaining a motion of the first embodiment shown in FIG. 3;

FIGS. 13(A), 13(B) and 13(C) and 14 are flow charts explaining operations of the second embodiment.

DESCRIPTION OF THE PREFERRED EMBODIMENTS

Figure 1:
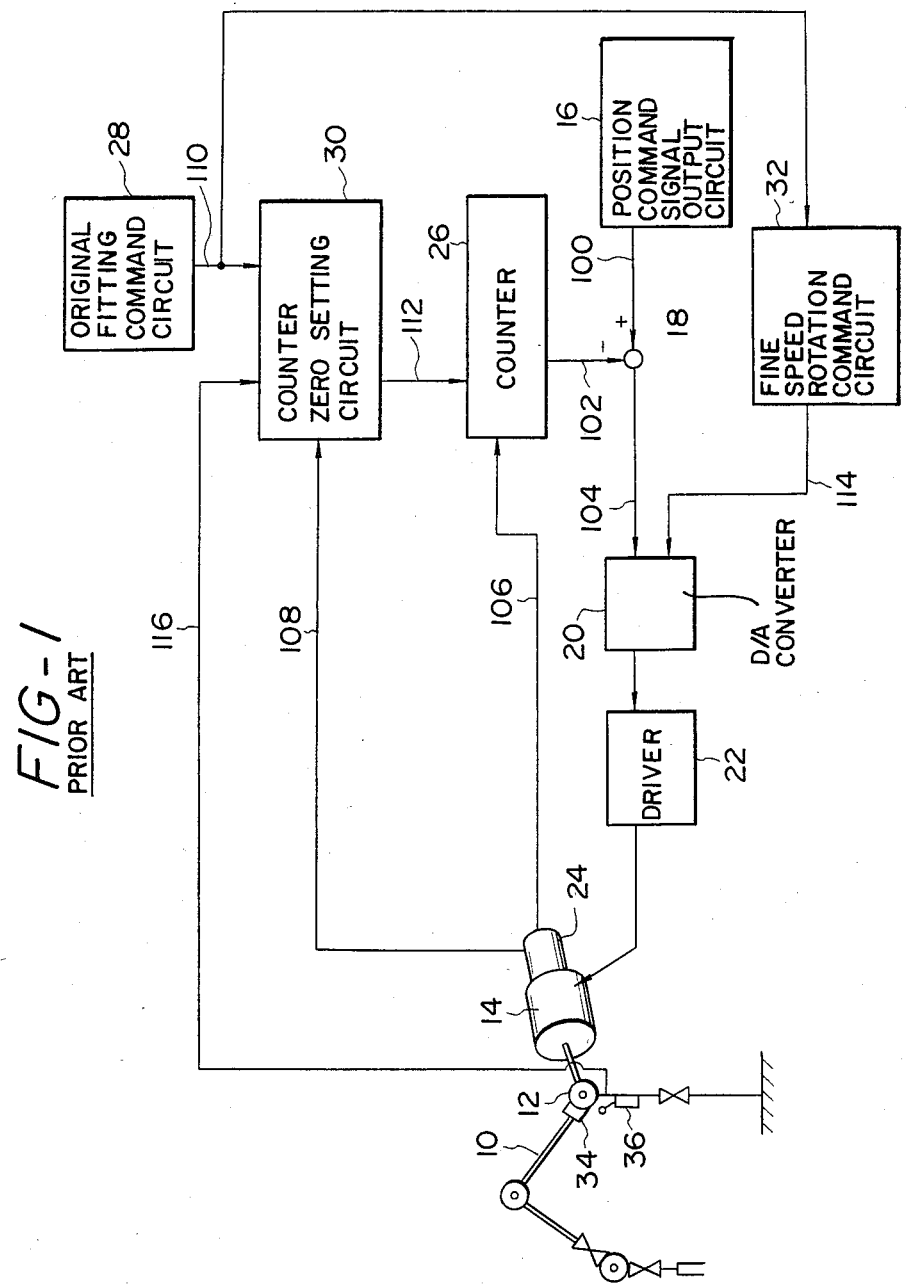
FIG. 1 is a block diagram of a robot to which a prior method is applied.
Figure 3:
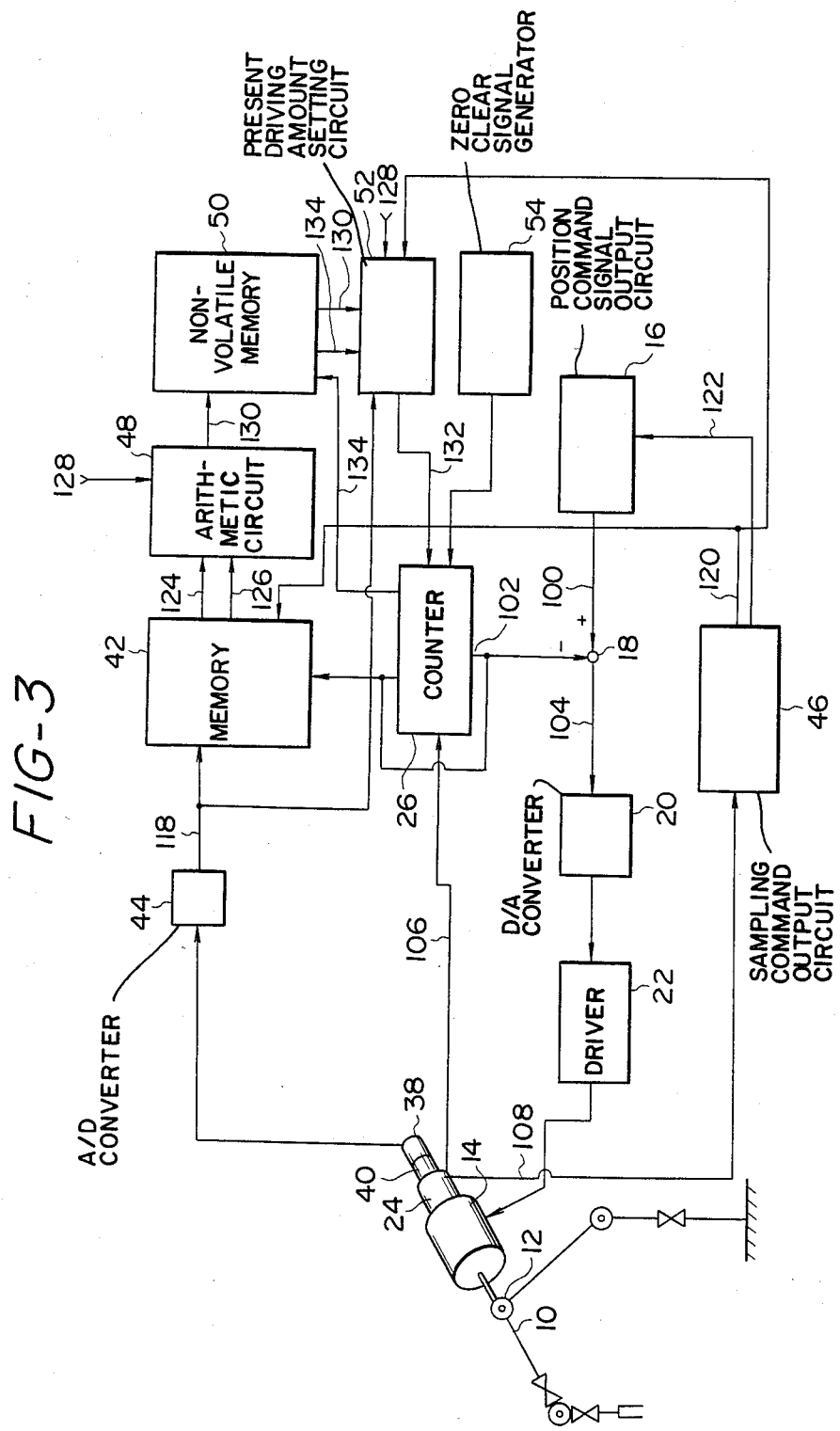
FIG. 3 is a block diagram of a first embodiment in which the present invention is applied to a robot.

FIG. 3 shows an industrial robot where an apparatus to which the present invention is applied is used. Same reference numerals as in FIG. 1 are used in FIG. 3 to designate same or similar members or parts, so that detailed descriptions thereof will be omitted.

In the embodiment according to the present invention the arm 10 is not subjected to a manual operation in the present position indication but it is subjected to an automatic operation. Accordingly, the dog 34 and the switch 36 shown in FIG. 1 are not provided in the present embodiment.

In addition thereto, a potentiometer 38 is used as an absolute driving amount detector detecting an absolute driving amount of the motor 14 and is connected to the driving shaft of the motor 14 through a reduction gear 40 so that the encoder 24 is subjected to multi-rotation within the range of rotation of the arm 10 but the potentiometer 38 is rotatably driven within its one rotation. In the present embodiment the potentiometer 38 having a high accuracy and a high analysability is not required and, therefore, an inexpensive encoder of an absolute type with a low accuracy and a low analysability can also be used instead of the potentiometer 38.

An absolute driving amount 118 detected by the potentiometer 38 and a feedback amount 102 (herein referred to as a relative driving amount) put out from the counter 26 are stored in a memory 42 of a coefficient and constant calculating circuit for calculating coefficient and constant. The absolute driving amount 118 is supplied to the memory 42 after it is digitalized by an A/D converter 44.

The relative driving amount 102 and the absolute driving amount 118 are stored in the memory 42 in each supply of a driving amount sampling command signal 120 put out from a sampling command output circuit 46. In the present embodiment the sampling command output circuit 46 puts out the driving amount sampling command signal 120 in each supply of the reference pulse 108 thereto. That is, since the reference pulse 108 is put out at the origin of the encoder 24, the driving amount sampling command signal 120 is put out from the sampling command output circuit 46 whenever the encoder 24 is subjected to a multi-rotation drive to reach the origin. As a result, the absolute driving amount 118 and the relative driving amount 102 are stored in the memory at every reach of the encoder 24 to the origin. The sampling command output circuit 46 supplies a stop command signal 122 to a position command signal output circuit 16 simultaneously with the output of the driving amount sampling command signal 120 so as to stop the rotation of the motor 14.

The sampled relative driving amount 124 and the sampled absolute driving amount 126 stored in the memory 42 is read out to an arithmetic circuit 48 housed in the coefficient and constant calculating circuit, a coefficient and constant 130 of a linear approximate equation 128 representing the relation between the relative driving amount 102 and the absolute driving amount 118 is obtained in the arithmetic circuit 48 and the coefficient and constant 130 is stored in a non-volatile memory 50. In other words, the arithmetic circuit 48 calculates the coefficient (A) and constant (B) 130 of the linear approximate equation 128 represented by an equation $Y=AX+B$, in which the X is the absolute driving amount 118 and the Y is the relative driving amount 102, by for example a minimum square method, and it supplies the coefficient (A) and constant (B) to the non-volatile memory 50.

In the embodiment according to the present invention a core memory is used as the non-volatile memory 50 but MNOS, MAOS or FAMOS can also be used instead of the core memory.

Thus, as the coefficient and constant 130 of the linear approximate equation 128 obtained in the coefficient and constant arithmetic circuit is stored in the non-volatile memory 50, the coefficient and constant 130 is maintained in the non-volatile memory 50 even if the power source for the robot according to the embodiment is cut off, and, therefore, the coefficient and constant 130 can be used at the restarting time or at the reversion-starting time of the robot.

In this manner, the coefficient and constant 130 is stored in the non-volatile memory 50 for the restart or the reversion-start of the robot and it is read out to an present driving amount setting circuit 52 when the robot is restarted or reversion-started. The absolute driving amount 118 and the driving amount sampling command signal 120 are also supplied to the present driving amount setting circuit 52. At the restarting or reversion-starting time the motor 14 is driven in response to the position command signal 100 from the position command signal output circuit 16 and the reference pulse 108 is put out from the encoder 24 whereby the driving of the motor 14 is stopped. At this time the present driving amount setting circuit 52 samples the absolute driving amount 118 in the stopped position in response to the driving amount sampling command signal 120 and it also reads in the coefficient and constant 130 from the non-volatile memory 50. That is, when the motor 14 is driven from its present, or starting, position in the starting time of the motor 14 up to the sampling position near the present or starting, position, the present driving amount setting circuit 52 is capable of reading in the absolute driving amount 118 in the sampling position and the coefficient and constant 130 stored in the non-volatile memory 50. The present driving amount setting circuit 52 assigns the absolute driving amount 118 and the coefficient and constant 130 to the linear approximate equation 128 and it obtains a relative driving amount 132 of the sampling position in the starting time of the motor 14 to set the relative driving amount 132 in the counter 26.

As shown in FIG. 3, an offset value 134 is supplied from the counter 26 to the non-volatile memory 50. The offset value 134 corresponds to a gap between the mechanical origin of the motor 14 and the electrical origin of the encoder 24 and it is stored in the non-volatile memory 50 when the origin indication is conducted in the apparatus according to the present invention. The present driving amount setting circuit 52 reads in the coefficient and constant 130, simultaneously therewith also reads in the offset value 134 and adds the offset value 134 to the relative driving amount from the electrical origin of the encoder 24 obtained by assigning the absolute driving amount 118 to the linear approximate equation 128 up to the sampling position so as to obtain the relative driving amount 132 from the mechanical origin of the motor 14 up to the sampling position.

In order to obtain the offset value 134, the counter 26 must preliminarily be cleared to zero at the time of the origin indication and the zero clear operation is carried out by a zero clear signal generator 54.

In the above embodiment, a comparator 18, a D/A converter 20 and a driver 22 are used, which have the same or similar constructions and functions as the comparator 18, the A/D converter 20 and the driver 22 explained above in the prior art.

Figure 6A:
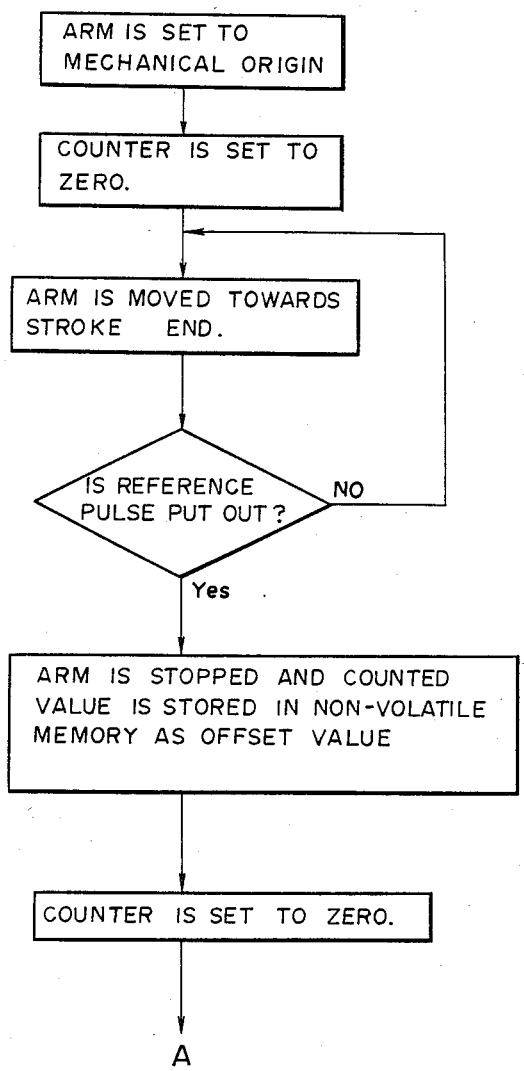
FIGS. 6(A), 6(B) and 6(C) are flow charts explaining a motion of the first embodiment shown in FIG. 3 until coefficient and constant of a linear approximate equation are stored in a memory.
Figure 6B:
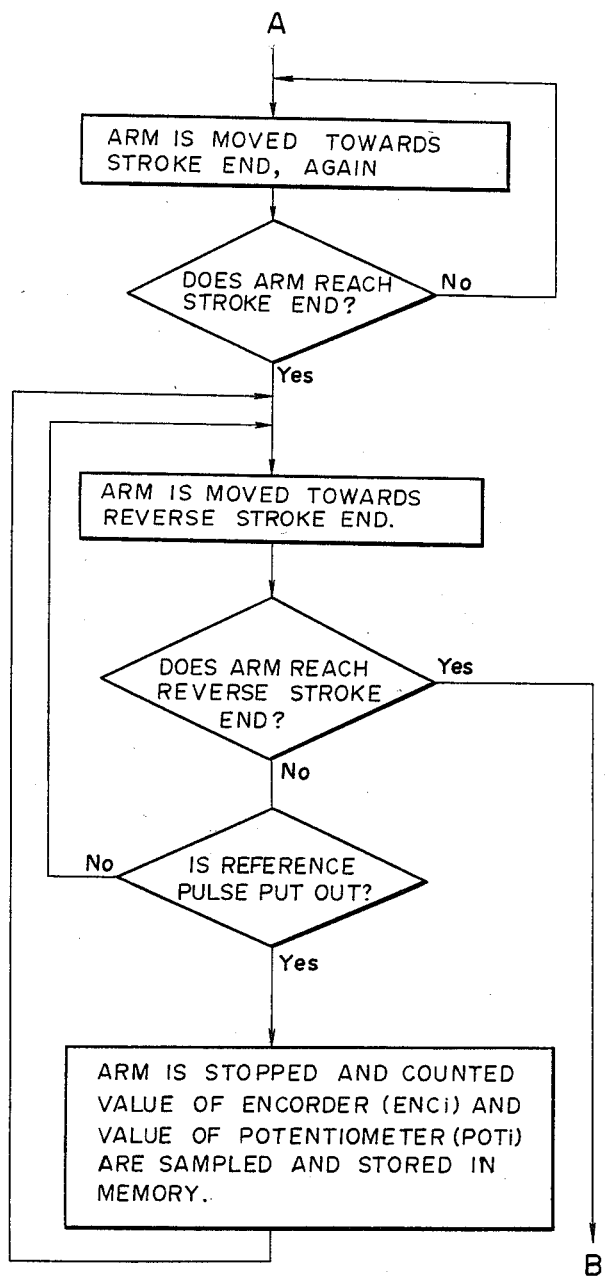
Figure 6:
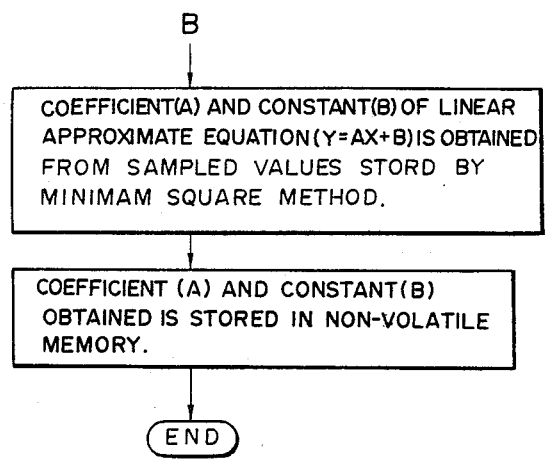
Figure 7:
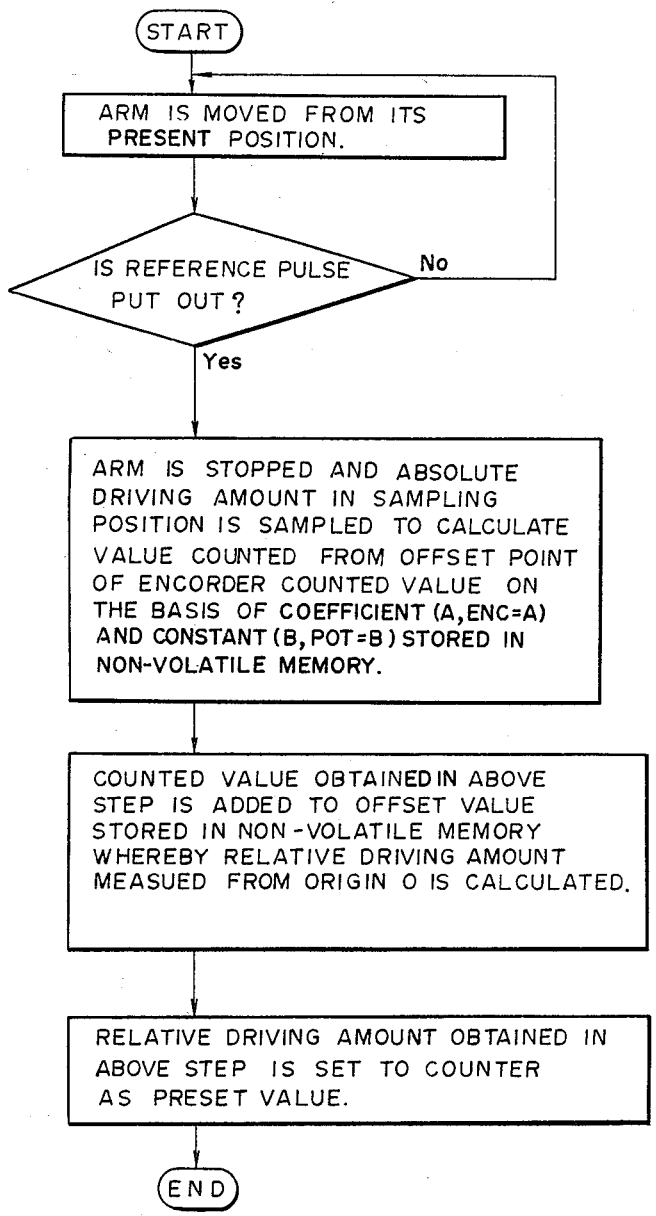
FIG. 7 is a flow chart explaining data of the first embodiment shown in FIG. 3 until an present position indication is completed in a starting time of a motor.

Description will now be given of operation of the present embodiment on the basis of a diagram explaining sampling motions shown in FIG. 4, a graph shown in FIG. 5 and flow charts shown in FIGS. 6 and 7.

The arm 10 is set to its mechanical origin by use of a levelling instrument, a transit or the like. In this situation the zero-clear signal generator 54 operates to clear the contents of the counter 26 to set zero.

The position command signal output circuit 16 puts out the position command signal 100 to drive the arm 10. At the time the arm 10 is driven towards the end point $ENC_1$ to reach the origin Os of the encoder 24, as C shown in FIG. 4, and the reference pulse 108 is supplied to the sampling command output circuit 46 so that the driving amount sampling command signal 120 is supplied from the sampling command output circuit 46 to the non-volatile memory 50 and a stop command signal 122 is also supplied therefrom to the position command signal output circuit 16. The arm 10 is stopped at the origin Os of the encoder 24 in response to the stop command signal 122 and at the time the relative driving amount 102 in the origin Os is stored in the non-volatile memory 50 in response to the driving amount sampling command signal 120. In this situation the zero clear signal generator 54 is reworked to clear the contents of the counter 26 to set zero.

In the above manner the origin Os of the encoder 24 is set in correspondence with the origin O of the motor 14 and the driving amount pulse 106 put out in the origin Os is defined as an origin pulse. In the embodiment according to the present invention, the offset value of both the origins O,Os, i.e. the number of the driving amount pulses 106 counted between both the origins O and Os by the counter 26, is stored in the non-volatile memory 50 as data for the correspodence of both the origins O and Os. After the origin indication is carried out in the above manner, the arm 10 is further driven towards an end point $ENC_1$, and when the arm 10 reaches the end point $ENC_1$ it is driven towards an end point $ENC_n$ reverse to the end point $ENC_1$. The drive of the arm 10 to the end point $ENC_n$ is performed in order to sample the relative driving amount 102 and the absolute driving amount 118 at each predetermined interval o the driving amount pulses 106. In the present embodiment since the driving amount sampling command signal 120 and the stop command signal 122 are put out in each one rotation of the encoder 24, the motor 14 is stopped at the sampling positions ($ENC_i$, ... $ENC_3$, $ENC_2$, ENC, ... $ENC_{n-1}$, $ENC_n$) situated in each one rotation of the encoder 24 based upon the origin Os so that the relative driving amount 102 and the absolute driving amount 118 in each sampling position ENC are stored in the memory 42.

Figure 2:
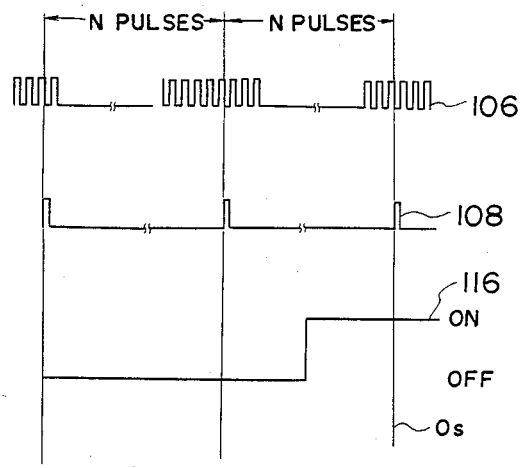
FIG. 2 is a timing chart explaining an origin indication of the robot shown in FIG. 1.

In case that the number of slits formed in the encoder 24 is N pieces, the driving amount pulses 106 of N pieces are put out while two reference pulses 108 are put out, as shown in FIG. 2, the relative driving amounts 102 sampled in the respective sampled positions $ENC_i$, $ENC_3$, $ENC_2$, $ENC_1$, $ENC_{n-1}$, $ENC_n$ become $-N$, $$-\left(\frac{n}{2}-2\right) \times N, -\left(\frac{n}{2}-1\right) \times N, -\frac{n}{2} \times N,$$

$$\left(\frac{n}{2}-1\right) \times N, \frac{n}{2} \times N$$

and the absolute driving amounts 118 counted from the origin O are $-N+\text{OFFSET}$, $$-\left(\frac{n}{2}-2\right) \times N + \text{OFFSET},$$

$$-\left(\frac{n}{2}-1\right) \times N + \text{OFFSET}, -\frac{n}{2} \times N + \text{OFFSET},$$

$$\left(\frac{n}{2}-1\right) \times N + \text{OFFSET}, \frac{n}{2} \times N + \text{OFFSET},$$

respectively, when the rotation of the arm 10 in a clockwise direction is defined as a plus direction.

Thus, after the samplings of the relative driving amounts 102 and the absolute driving amounts 118 in the respective sampling positions ENC are effected and they are read in the memory 42, the arithmetic circuit 48 obtains the coefficient and constant 130 of the linear approximate equation 128 according a minimum square method by use of the sampled driving amounts 124 and 126 and the coefficient and constant 130 is stored in the non-volatile memory 50.

As the counted value (OFFSET) 134 and the coefficient and constant 130 are preliminarily stored in the non-volatile memory 50, they are maintained in the non-volatile memory 50 even if the power source of the robot is cut off.

After the above pretreatment is conducted, the robot begins to work in response to the position command signal 100 and the arm 10 of the robot is controlled to its attitude responding to the position command signal 100 in the same manner as the prior apparatus.

Thus, the robot is at once stopped when the robot is restarted or the power stoppage instantaneously happens during the work of the robot. In general, the stop position of the robot is separated far from the origin O because the work of the robot is usually conducted at positions far from the origin O in view of the working area of the robot.

At this time the motor 14 is driven in the embodiment of the present invention and the arm 10 is moved from the stop position up to the sampling position ENC near the stop position. When the arm 10 reaches the sampling position ENC, the driving amount sampling command signal 120 and the stop command signal 122 are put out in response to the reference pulse 108 whereby the motor 14 is stopped in the sampling position ENC at a starting time of the motor and together therewith the absolute driving amount 118 in the sampling position ENC at the starting time is read in the present driving amount setting circuit 52. Simultaneously the coefficient and constant 130 and the offset value 134 are also read in the present driving amount setting circuit 52. The present driving amount setting circuit 52 calculates the relative driving amount 132 based upon the origin O from this data and the linear approximate equation 128, and it sets the relative driving amount 132 in the counter 26.

The state of the present position indication described above is shown as a graph in FIG. 5. In this case the present stop position of the motor 14 is indicated by Xe, Ye and the relative driving amount 132 in the sampling position $ENC_4$ is set in the counter 26.

As set forth above, in the robot according to the present embodiment the coefficient and constant 130 of the linear approximate equation 128 representing the relation between the relative driving amount 132 and the absolute driving amount 118 is preliminarily stored in the non-volatile memory 50 so that the present position indication can be conducted utilizing the contents of the non-volatile memory 50 at the starting time of the motor 14 without affecting the origin indication of the motor 14. Accordingly, the motor 14 can be driven directly without such a complicated operation as the origin indication of the motor and the robot is operated in the same manner as the case that an expensive encoder of an absolute type is used, whereby the operationability of the robot can be enhanced greatly.

In addition thereto, as the motion range of the driven body, or the robot, is small in the present position indication, the robot according to the present invention is not required to be operated for avoiding obstacles whereby also the operationability can be improved.

Moreover, if the present position indication is carried out automatically in the robot according to the present embodiment so that the operationability can further be increased.

A second embodiment will now be described below.

Figure 8:
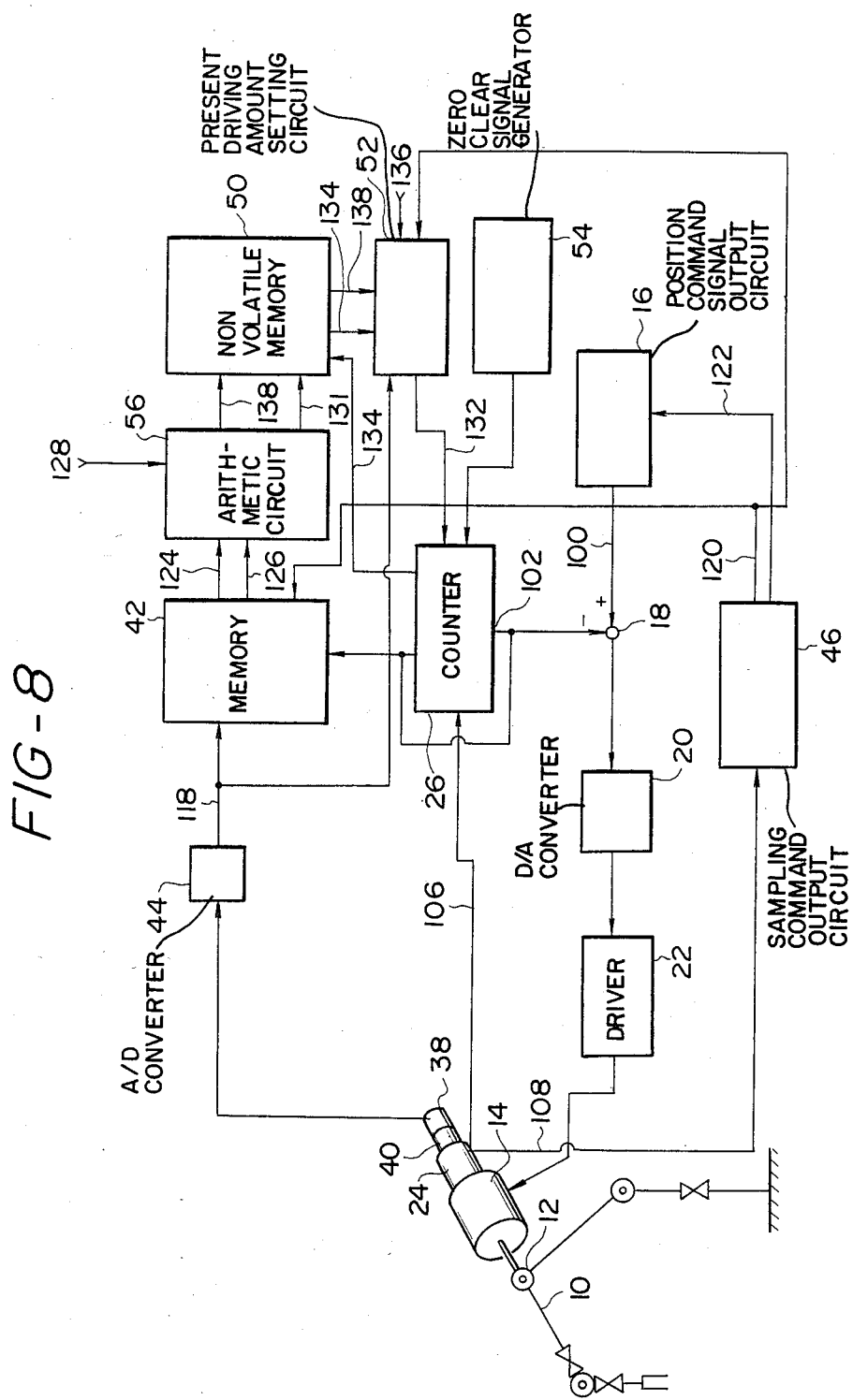
FIG. 8 is a block diagram of a second embodiment in which the present invention is applied to a robot.

FIG. 8 shows the second embodiment in which the present invention is applied to an industrial robot. Same reference numerals as shown in FIG. 3 are used in FIG. 8 to designate same or similar members, so that detailed descriptions thereof will be omitted.

A sampled relative driving amount 124 and a sampled absolute driving amount 126 stored in the memory 42 in the same manner as the first embodiment are read out in an arithmetic circuit 56 housed in the coefficient and constant calculating circuit for calculating coefficient and constant. The arithmetic circuit 56 obtains coefficients and constants 138 of a plurality of linear approximate equations constituting a polygonal line 136 representing the relation between the relative driving amounts 124 and the absolute driving amounts 126 within a predetermined allowable error and it causes the coefficients and constants 138 to correspond to available areas 131 where the errors of the respective linear approximate equations are allowable so as to store both the coefficients and constants 138 and the available areas 131 in the non-volatile memory 50. That is, the arithmetic circuit 56 calculates the coefficients (Ai) and constants (Bi) 138 of a plurality of the linear approximate equations represented by equations $Y = A_i X + B_i$, in which the X is the absolute driving amount 118 and the Y is the relative driving amount 102, and it causes the non-volatile memory 50 to store the coefficients (Ai) and constants (Bi) 138 and the available areas 131 therein while the coefficients (Ai) and constants (Bi) corresponds to the available areas 131.

As the respective coefficients and constants 138 and the respective available areas 131 obtained in the coefficient and constant calculating circuit are stored in the non-volatile memory 50 in the above manner, the coefficients and constants 138 and the allowable areas 131 are maintained in the non-volatile memory 50 while they correspond to each other even if the power source for the robot according to the present embodiment is cut off, and, therefore, both the coefficients and constants 138 and the available areas 131 can be used at the restarting time or at the reversion-starting time.

In this manner the coefficients and constants 138 and the available areas 131 are stored in the non-volatile memory 50 for the restart or the reversion-start of the robot and they are read out to the present driving amount setting circuit 52 when the robot is restarted or reversion-started. The absolute driving amount 118 and the driving amount sampling command signal 120 are also supplied to the present driving amount setting circuit 52. At the restarting or reversion-starting time, the motor 4 is driven in response to the position command signal 100 put out from the position command signal output circuit 16 and the reference pulse 108 is put out from the encoder 24 whereby the driving of the motor 14 is stopped. At this time the present driving amount setting circuit 52 samples the absolute driving amount 118 in the stopped position in response to the driving amount sampling command signal 120, it detects the available areas 131 containing the absolute driving amounts 118 sampled and it reads in the coefficients and constants 138 corresponding to the available areas 131 from the non-volatile memory 50. In other words, when the shaft of the motor 14 is driven from its present rotational position at the starting time of the motor 14 up to the sampling position in the neighborhood of the present rotational position, the present driving amount setting circuit 52 is capable of reading in the absolute driving amount 118 and the coefficients and constants 138 corresponding to the available areas 131 of the respective linear approximate equations containing the absolute driving amount 118 from the non-volatile memory 50. The present driving amount setting circuit 52 assigns the absolute driving amounts 118 and the coefficients and constants 138 to the linear approximate equations constituting the polygonal line 136 and obtains a relative driving amount 132 of the sampling position at the starting time of the motor 14 so as to set the relative driving amount 132 in the counter 26.

The robot according to the second embodiment is constructed in the same manner as that according to the first embodiment except for the above-described members or parts.

Description will now be given of operation of the second embodiment.

After the sampling of the relative driving amounts 102 and the absolute driving amounts 118 in the respective sampling positions ENC as shown in FIG. 4 are effected and are read in the memory 42 in the same manner as the first embodiment, the arithmetic circuit 56 causes the non-volatile memory 50 to store the coefficients and constants 138 of the respective linear equations constituting the polygonal line 136 and the respective available areas 131 in which the respective linear approximate equations are put in the predetermined allowable errors in the following manners.

Figure 9:
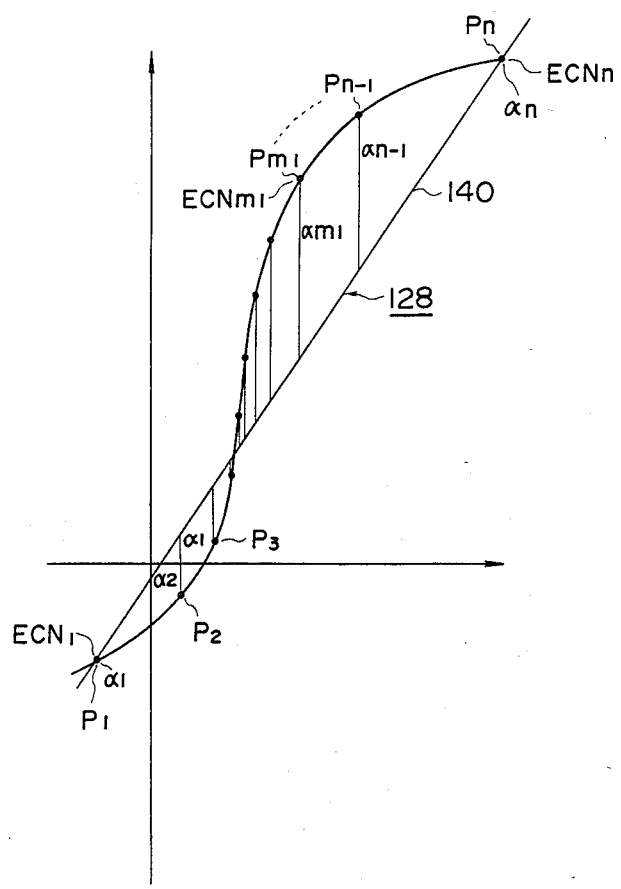
FIGS. 9 through 11 are graphs explaining a calculating motion of a coefficient and constant calculating circuit of a second embodiment.

By use of the relative driving amount 124 and the absolute driving amount 126 sampled in each of end point sampling positions ECN, and ECNn, a linear approximate equation 140 covering the end point sampling positions ECN, and ECNn is calculated in the arithmetic circuit 56, as shown in FIG. 9, and the coefficient and constant 138 thereof is once stored in the non-volatile memory 50. Since the potentiometer 38 used in the present embodiment does not have a high accuracy, the error of the linear approximate equation 140 is beyond the allowable error and, therefore, the linear approximate equation 140 is not utilized in the present embodiment.

Figure 10:
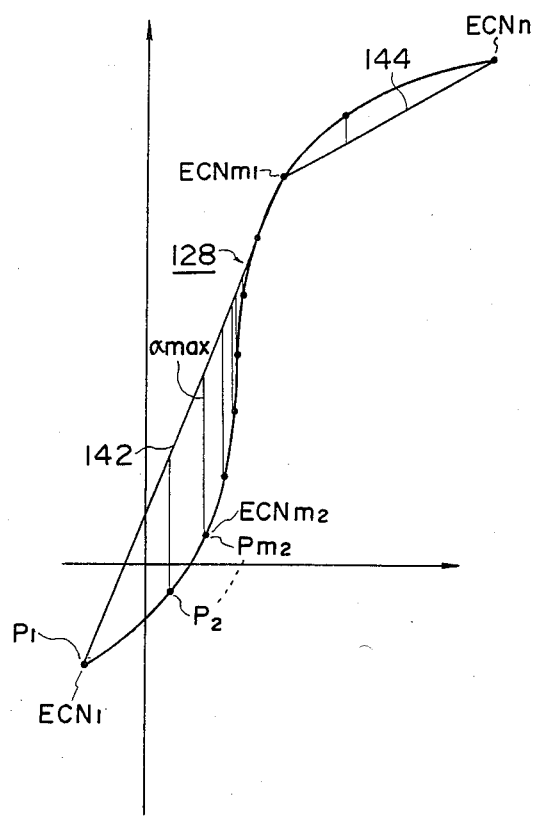

Next, the deviations (shown as $\alpha_1, \alpha_2, \alpha_3 \ldots, \alpha m1, \ldots \alpha_{n-1}, \alpha_n$ in FIG. 9) between the absolute driving amounts 126 (shown as $P_1, P_2, P_3, \ldots, Pm1, Pn-1, Pn$ in FIG. 9) sampled in the respective sampling positions ENC and the linear approximate equation 140 in the respective sampling positions ECN are obtained in order from the end point sampling position $ECN_1$ and a maximum deviation $\alpha$ max of the deviations $\alpha$ is obtained so that a second linear approximate equation 142 covering the end point sampling position $ECN_1$ and the sampling position ECNm1 showing the maximum deviation $\alpha$ max and a third linear approximate equation 144 covering the end point sampling position ECNn and the sampling position ECNm1 are obtained as shown in FIG. 10. The coefficients and constants 138 of the second and third approximate equations 142, 144 thus obtained are stored in the non-volatile memory 50.

In the same manner as the above, the deviations $\alpha$ between the linear approximate equation 142 and the absolute driving amounts P and those between the linear approximate expression 144 and the absolute driving amounts P are obtained and the maximum deviations $\alpha$ max of the deviations $\alpha$ is obtained so that it is judged whether or not the maximum deviation $\alpha$ max in the sampling position ECNm2 shown in FIG. 10 is put in the predetermined allowable error.

Figure 11:
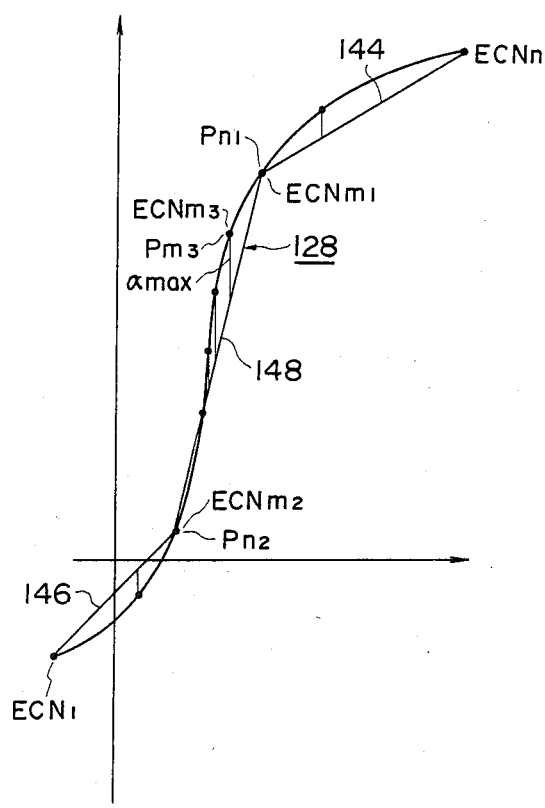

In the present embodiment the maximum deviation $\alpha$ max is judged to be beyond the allowable error so that a fourth linear approximate equation 146 covering the sampling position ECN1 and a sampling position ECNm2 and a fifth linear approximate equation 148 covering the sampling position ECNm2 and a sampling position ENCm1 are obtained as shown in FIG. 11.

As similar to the above manner, the maximum deviation $\alpha$ max of the deviations $\alpha$ between the linear approximate equations 144, 146, 148 and the absolute driving amounts P sampled respectively is obtained so that it is judged whether or not the deviation $\alpha$ max is the predetermined allowable error.

In the present embodiment the maximum deviation $\alpha$ max is judged to be put in the allowable error so that the coefficients and constants 138 of the respective linear approximate equations 144, 146, 148 are stored in the non-volatile memory 50. At this time the coefficients and constants 138 of the respective linear approximate equations 144, 146, 148 are stored in the non-volatile memory 50 while they are caused to correspond to the respective available areas 131 (shown as $P_1 \sim P_{m2}$, $P_{m2} \sim P_{m1}$, $P_{m1} \sim Pn$ in FIG. 11).

In this connection, real relative driving amounts can be obtained by use of such a device as a sensor, but in this embodiment the outputs of the encoder 24, i.e. the sampling positions ECN, are treated as the real relative driving amounts in view of cost or labor.

Thus, as the counted, or offset, value 134, the coefficients and the constants 138 and the available areas 131 are preliminarily stored in the non-volatile memory 50, they are maintained in the non-volatile memory 50 even if the power source of the robot is cut off.

After the above-described pretreatment is performed, the robot according to the present embodiment begins to work in response to the position command signal 100 and the arm 10 of the robot is controlled to its attitude responding to the position command signal 100 in the same manner as the first embodiment.

Thus, the robot is at once stopped when the robot is restarted or the power stoppage instantaneously happens during the work of the robot. In general, the stop position of the robot is separated far from the origin O because the work of the robot is usually conducted at positions far from the origin O in view of the working area of the robot.

At this time the motor 14 is driven in the second embodiment and the arm 10 is moved from the stop position up to the sampling position ENC in the neighborhood of the stop position. When the arm 10 reaches the sampling position ENC, the driving amount sampling signal 120 and the stop command signal 122 are put out in response to the reference pulse 108 whereby the motor 14 is stopped at the starting-time sampling position ENC and together therewith the absolute driving amount 118 in the starting-time sampling position ENC is read in the present driving amount setting circuit 52. The present driving amount setting circuit 52 detects the available area 131 corresponding to the absolute driving amount 118 read in and it reads in the coefficient and constant 138 of one of the linear approximate equation 144, 146, 148 corresponding to the available area 131 and the offset value 134. In addition, the present driving amount setting circuit 52 calculates the relative driving amount 132 based upon the origin O from the coefficient and constant 138, the offset value 134 and the one of the linear approximate expressions 144, 146, 148 and it sets the relative driving amount 132 in the counter 26.

Figure 12:
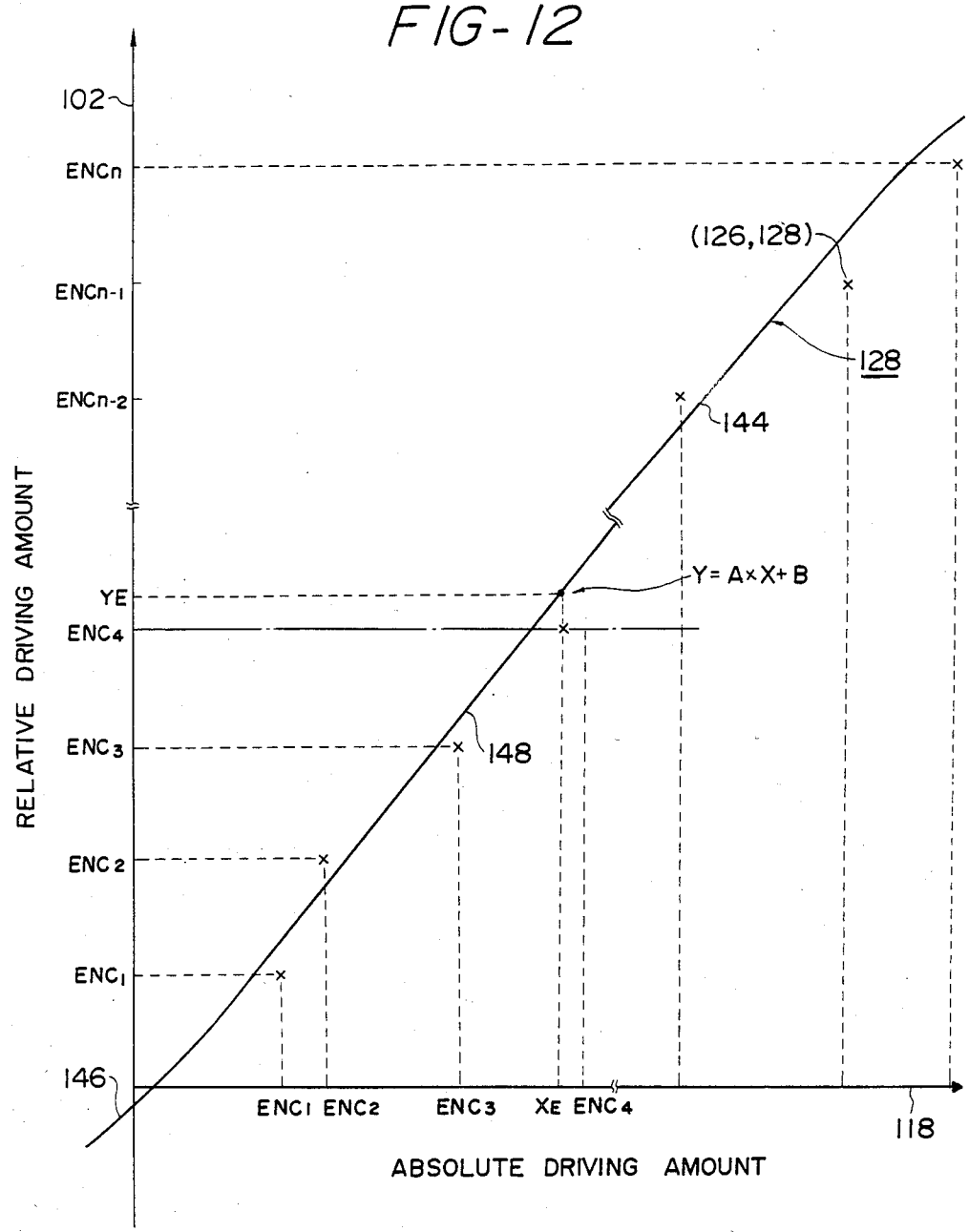
FIG. 12 is a graph explaining motions of storing and reading out of a memory.
Figure 13B:
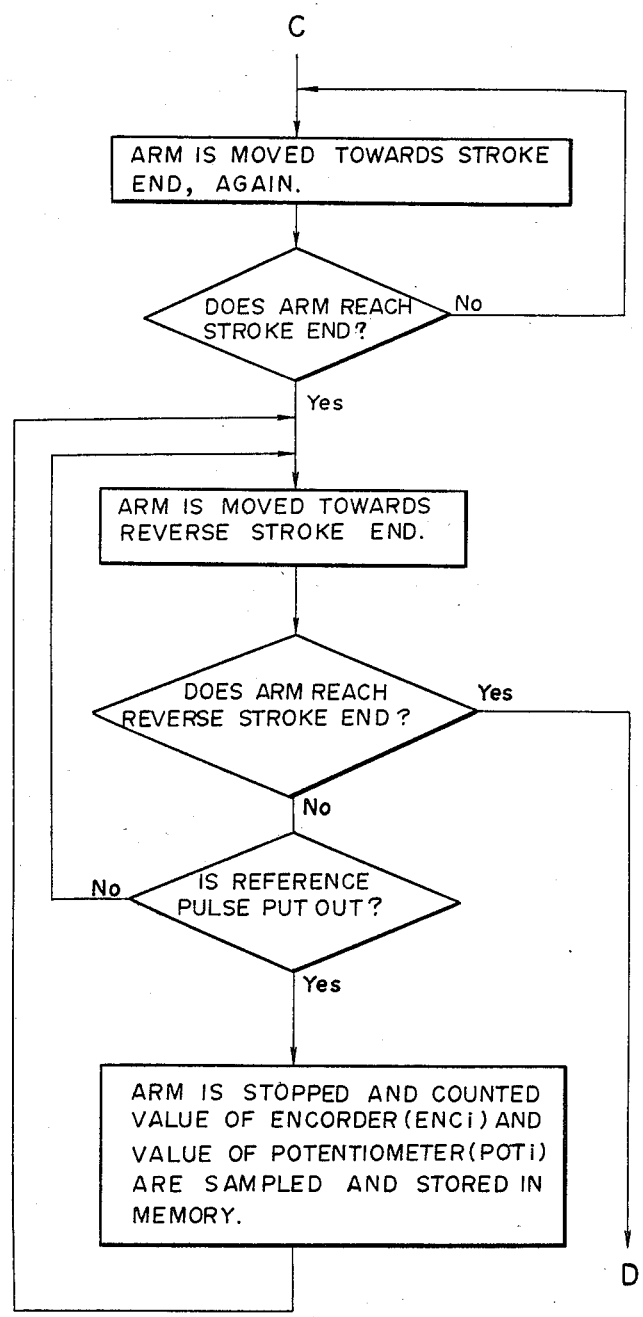
Figure 13C:
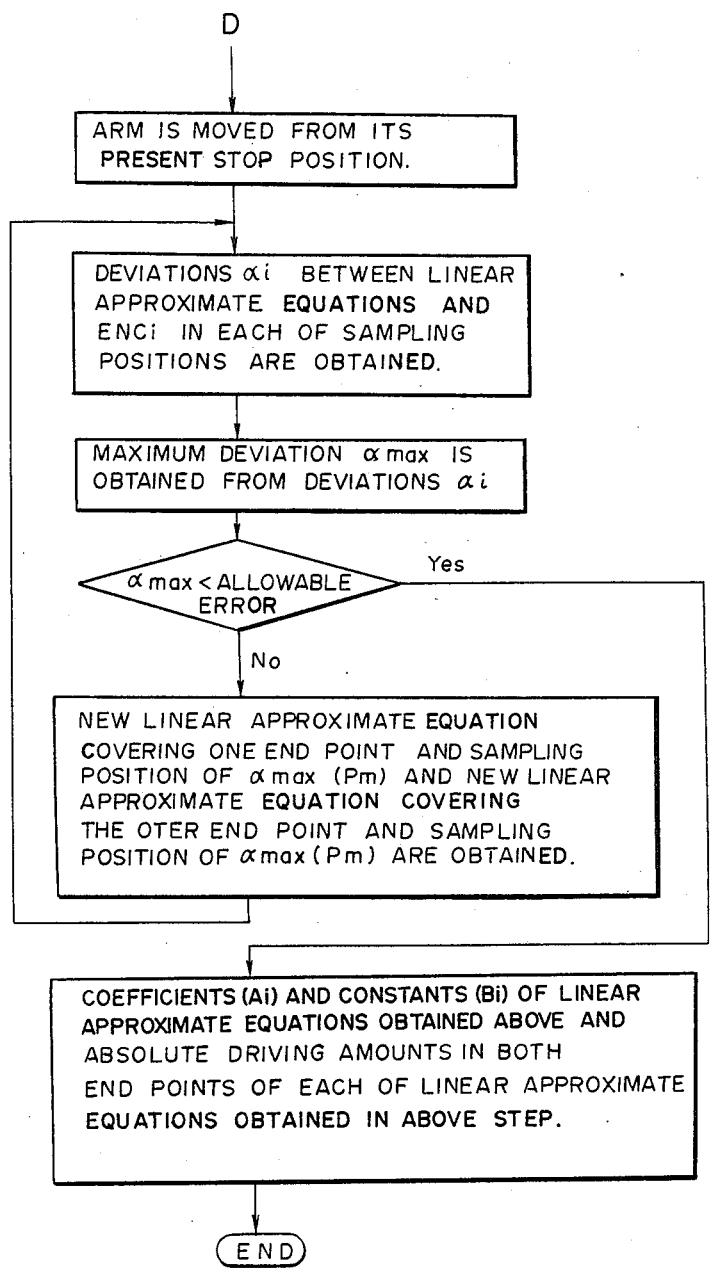
Figure 14:
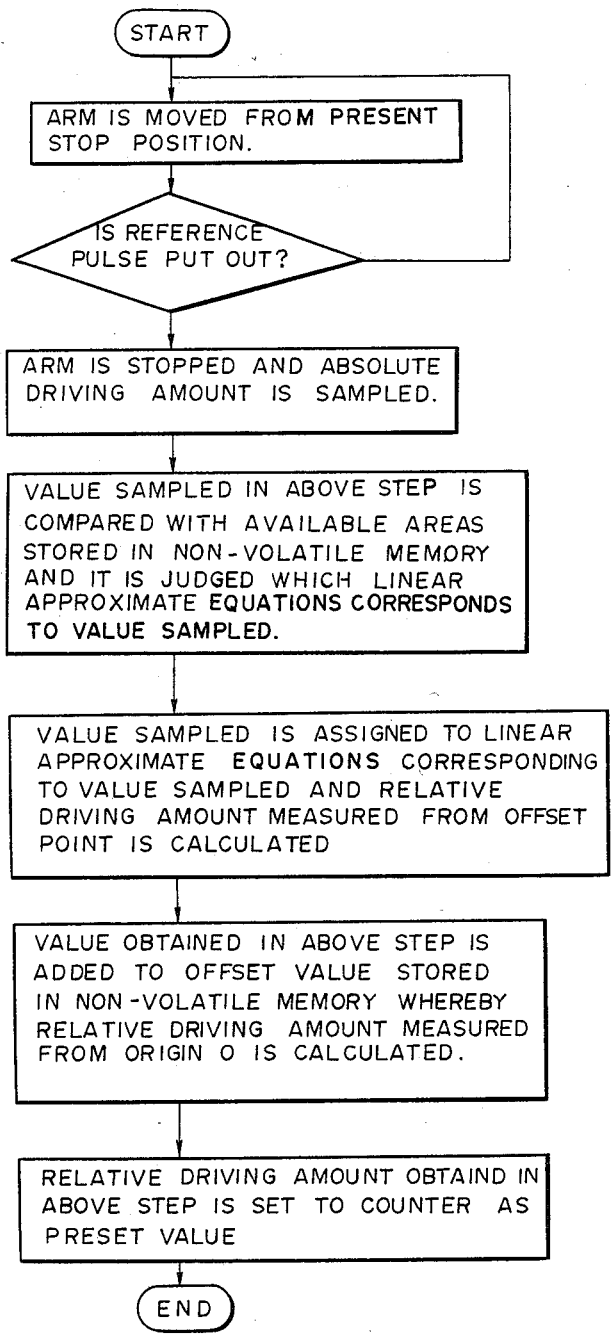

The state of the present position indication described above is shown as a graph in FIG. 12. In this case the present stop position of the motor 14 is indicated by Xe, Ye, and the relative driving amount 132 in the sampling position $ENC_4$ on the linear equation 148 is set in the counter 26.

As explained above, in the robot according to the second embodiment, the coefficients and constants 138 of a plurality of the linear approximate equations constituting the polygonal line 136 representing the relation between the relative driving amount 132 and the absolute driving amount 118 is preliminarily stored in the non-volatile memory 50 so that the present position indication can be conducted utilizing the contents of the non-volatile memory 50 at the starting time of the motor 14 without affecting the origin indication of the motor 14.

Accordingly, in the robot of the second embodiment its operationability is greatly enhanced in the same manner as the first embodiment.

In the above embodiments an encoder of a rotary type is used as the encoder but instead thereof an encoder of a linear type can also be used. Regarding the motor used in the above embodiments, a motor of a linear type can also be used. In addition, a velocity command output circuit can be used instead of the position command output circuit and, if done so, the velocity of the motor of the apparatus applied to the present invention can also be measured. Furthermore, for the purpose of obtaining the driving amount sampling command signal at each of predetermined intervals of the driving amount pulses put out from the encoder, a mechanical contact is driven at a predetermined interval of rotation, for example, one rotation or half rotation, of the encoder, and the apparatus to which the present invention is applied may be constructed so as to obtain the the driving amount sampling command signal in response to the contact output. However, the apparatus to which the present invention is applied can more simply constructed by using the reference pulse in the same manner as the above embodiments, as compared with the case that the mechanical contact is used.

What is claimed is:

1. A method for measuring a driving amount of a motor, which comprises the steps of:

detecting the number of driving pulses corresponding to a driving amount of the motor by use of an encoder of an increment type;

setting a driving amount pulse of the driving amount pulses responding to an origin of the motor;

counting the number of the driving amount pulses on the basis of the origin of the motor to obtain a relative driving amount of the motor based upon the origin of the motor from the counted number of the driving amount pulses;

sampling the relative driving amount of the motor and an absolute driving amount thereof at each predetermined interval of the driving amount pulses:

obtaining coefficient and constant of at least one linear approximate equation representing the relation between the relative driving amount and the absolute driving amount from the sampled relative and absolute driving amounts;

storing the coefficient and constant in a non-volatile memory;

driving a driving shaft of the motor from its present rotational position to a sampling position near the present rotational position at a starting time of the motor to sample an absolute driving amount of the motor at the starting time; and obtaining a relative driving amount of the motor in the sampling position at the starting time on the basis of the origin by use of the absolute driving amount at the starting time and of the coefficient and constant of the linear approximate equation stored in the non-volatile memory.

2. A method for measuring a driving amount of a motor as set forth in claim 1, wherein the steps of obtaining and storing the coefficient and constant comprises obtaining coefficient and constant of one linear approximate expression representing the relation between the relative driving amount and the absolute driving amount from the sampled relatived and absolute driving amounts and storing the coefficient and constant in a non-volatile memory.

3. A method for measuring a driving amount of a motor as set forth in claim 2, further comprising the steps of putting out a relative driving amount sampling command signal in response to each output of the reference pulse from the encoder and sampling the respective driving amounts in response to the relative driving amount sampling command signal.

4. A method for measuring a driving amount of a motor as set forth in claim 1, wherein the steps of obtaining and storing the coefficient and constant comprises obtaining coefficients and constants of a plurality of linear approximate equations constituting a polygonal line representing the relation between the relative driving amount and the absolute driving amount from the sampled relative and absolute driving amounts and causing available areas of the respective linear approximate equations, in which the deviation between the approximate relative driving amounts and real relative driving amounts corresponding to the absolute driving amounts is put in predetermined allowable error, to correspond to the coefficients and constants of the respective linear approximate equations and storing the available areas and the coefficients and constants in the non-volatile memory, and the step of obtaining the relative driving amount of the motion in the sampling position comprises reading out the coefficient and constant about the linear approximate equation existing in the available area, where the absolute driving amount of the motor is put at the starting time from the non-volatile memory, and obtaining a relative driving amount of the motor at the starting time from the coefficient and constant read out and the absolute driving amount at the starting time.

5. An apparatus for measuring a driving amount of a motor, comprising:

an encoder of an increment type mounted on a driving shaft of the motor and putting out driving amount pulses of the number corresponding to a driving amount of the motor;

a counter counting the number of the driving amount pulses on the basis of an origin of the motor to detect a relative driving amount of the motor;

an absolute driving amount detector detecting an absolute driving amount of the motor;

a sampling command output circuit putting out a driving amount sampling command signal at each predetermined interval of the driving amount pulses;

a coefficient and constant calculating circuit for sampling the relative driving amounts and the absolute driving amounts in response to the respective driving amount sampling command signals and obtaining coefficient and constant of at least one linear approximate equation representing the relation between the relative driving amount and the absolute driving amount from the respective sampled relative and absolute driving amounts;

a non-volatile memory for the coefficient and constant of the linear approximate equation obtained in the coefficient and constant calculating circuit therein; and a present driving amount setting circuit for obtaining a relative driving amount of the motor at a starting time of the motor in a sampling position from the coefficient and constant read out of the non-volatile memory and an absolute driving amount sampled in response to the driving amount sampling command signal when the motor is driven from a present rotational position of the motor up to the sampling position near the present rotational position, and setting the relative driving amount of the motor at the starting time in the counter.

6. An apparatus for measuring a driving amount of a motor as set forth in claim 5, wherein the coefficient and constant calculating circuit is provided with a means for obtaining coefficient and constant of one linear approximate equation representing the relation between the relative driving amount and the absolute driving amount.

7. An apparatus for measuring a driving amount of a motor as set forth in claim 6, wherein the sampling command output circuit is provided with a means for putting out the driving amount sampling command signal in response to each of the outputs of the reference pulses from the encoder of an increment type.

8. An apparatus for measuring a driving amount of a motor as set forth in claim 6, wherein the absolute driving amount detector comprises a potentiometer.

9. An apparatus for measuring a driving amount of a motor as set forth in claim 8, wherein the potentiometer is connected to the driving shaft of the motor through a reduction gear.

10. An apparatus for measuring a driving amount of a motor as set forth in claim 6, wherein the non-volatile memory comprises a core memory.

11. An apparatus for measuring a driving amount of a motor as set forth in claim 5, wherein the coefficient and constant calculating circuit is provided with a means for obtaining coefficients and constants of a plurality of linear approximate equations constituting a polygonal line representing the relation between the relative driving amount and the absolute driving amount from the sampled relative and absolute driving amounts and causing available areas of the respective linear equations, in which the deviation between the approximate relative driving amounts and real relative driving amounts corresponding to the absolute driving amounts is put in predetermined allowable error, to correspond to the coefficients and constants of the linear approximate equations, the non-volatile memory is provided with means for storing the available areas and the coefficients and constants corresponding to each other, and the present driving amount setting circuit is provided with a means for reading out from the coefficient and constant of the linear approximate equation of the available area containing the absolute driving amount at the starting time from the non-volatile memory and obtaining a relative driving amount at the starting time from the coefficient and constant read out and the absolute driving amount at the starting time.

12. An apparatus for measuring a driving amount of a motor as set forth in claim 11, wherein the sampling command output circuit is provided with a means for putting out the driving amount sampling command signal in response to each of the outputs of the reference pulses from the encoder.

13. An apparatus for measuring a driving amount of a motor as set forth in claim 11, wherein the absolute driving amount detector comprises a potentiometer.

14. An apparatus for measuring a driving amount of a motor as set forth in claim 13, wherein the potentiometer is connected to the driving shaft of the motor through a reduction gear.

15. An apparatus for measuring a driving amount of a motor as set forth in claim 11, wherein the non-volatile memory comprises a core memory.

16. An apparatus for measuring a driving amount of a motor, which comprises:

an encoder of an increment type mounted on a driving shaft of the motor and putting out driving amount pulses of the number responding to the driving amount of the motor;

a counter counting the number of the driving amount pulses put out from the encoder on the basis of a reference pulse of the driving amount pulses corresponding to an origin of the motor to detect a relative driving amount of the motor;

a potentiometer connected to the driving shaft of the motor through a reduction gear and putting out an absolute driving amount of the motor;

an absolute driving amount detector detecting absolute driving amount put out from the potentiometer;

an A/D converter converting the absolute driving amount put out from the absolute driving amount detector to a digital signal;

a sampling command output circuit putting out a driving amount sampling command signal at a predetermined interval of the driving amount pulses on the basis of the reference pulse put out from the encoder;

a coefficient and constant calculating circuit for sampling the relative driving amounts and the absolute driving amounts converted to the digital signal to obtain coefficient and constant of at least one linear approximate equation representing the relation between the relative driving amount and the absolute driving amount from the relative and absolute driving amounts in response to the driving amount sampling signals put out from the sampling command output circuit;

a non-volatile memory storing the coefficient and constant of the linear approximate equation put out from the coefficient and constant calculating circuit comprising a core memory;

a position command signal output circuit putting out a position command signal for driving the motor in response to a stop signal put out from the sampling command output circuit simultaneously with the output of the driving amount sampling signal therefrom;

a comparator obtaining a deviation between the relative driving amount put out from the counter and the position command signal put out from the position command signal output circuit;

a D/A converter converting the compared output from the comparator to an analog signal;

a driver driving the driving shaft of the motor from a present rotational position of the motor to a sampling position near the present rotational position at the starting time of the motor, in response to the compared output of the comparator converted to the analog signal; and a present driving amount setting circuit obtaining a relative driving amount of the motor at a starting time of the motor in the sampling position from the coefficient and constant read out of the non-volatile memory and an absolute driving amount sampled in response to the driving amount sampling command signal when the motor is driven from a present rotational position of the motor up to the sampling position near the present rotational position, and setting the relative driving amount of the motor at the starting time in the counter.

17. An apparatus for measuring a driving amount of a motor as set forth in claim 16, wherein the coefficient and constant calculating circuit is provided with a means for obtaining coefficient and constant of one linear approximate equation representing the relation between the relative driving amount and the absolute driving amount.

18. An apparatus for measuring a driving amount of a motor as set forth in claim 16, wherein the coefficient and constant calculating circuit is provided with a means for obtaining coefficients and constants of a plurality of linear approximate equations constituting a polygonal line representing the relation between the relative driving amount and the absolute driving amounts and causing available areas of the respective linear approximate equations, in which the deviation between the approximate relative driving amounts and real relative driving amounts corresponding to the absolute driving amounts is put in predetermined allowable error, to correspond to the coefficients and constants of the respective linear approximate equations, the non-volatile memory is provided with a means for storing the available areas and the coefficient and constants corresponding to each other, and the present driving amount setting circuit is provided with a means for reading out the coefficient and constant of the linear approximate equations of the available area containing the absolute equations of the available area containing the absolute driving amount at the starting time from the non-volatile memory, and obtaining a relative driving amount at the starting time from the coefficients and constants read out and the absolute driving amount at the starting time.

* * * * *